United States Patent
Monaco

(10) Patent No.: US 7,643,553 B2
(45) Date of Patent: Jan. 5, 2010

(54) OPTIMAL RATE ALLOCATION FOR A GROUP OF CHANNELS

(75) Inventor: Joseph Wilson Monaco, Cary, NC (US)

(73) Assignee: ARRIS Group, Inc., Suwanee, GA (US)

( * ) Notice: Subject to any disclaimer, the term of this patent is extended or adjusted under 35 U.S.C. 154(b) by 492 days.

(21) Appl. No.: 11/260,451

(22) Filed: Oct. 27, 2005

(65) Prior Publication Data

US 2006/0215760 A1 Sep. 28, 2006

Related U.S. Application Data

(60) Provisional application No. 60/622,051, filed on Oct. 27, 2004.

(51) Int. Cl.
*H04N 7/12* (2006.01)
*H04N 11/02* (2006.01)
*H04N 11/04* (2006.01)

(52) U.S. Cl. ............................. 375/240.06; 375/240.04

(58) Field of Classification Search ............. 375/240.16
See application file for complete search history.

(56) References Cited

U.S. PATENT DOCUMENTS 5,650,860 A * 7/1997 Uz .............................. 382/253
6,038,256 A * 3/2000 Linzer et al. ........... 375/240.12
6,040,861 A    3/2000 Boroczky et al.
6,195,388 B1   2/2001 Choi et al.
6,859,496 B1   2/2005 Boroczky et al.
2005/0030208 A1  2/2005 Abdat

OTHER PUBLICATIONS

International Preliminary Report on Patentability and Written Opinion for International Application No. PCT/US2005/038882, dated Nov. 13, 2008.
International Search Report, International Application No. PCT/US2005/038882, dated Oct. 14, 2008.
Böröczky, et al.; "Statistical Multiplexing Using MPEG-2 Video Encoders"; IBM J. Res. Develop; vol. 43, No. 4; Jul. 1999; pp. 511-520.

* cited by examiner

*Primary Examiner*—David Czekaj
*Assistant Examiner*—Jeremaiah C Huber
(74) *Attorney, Agent, or Firm*—Troy A. Van Aacken; Robert J. Starr

(57) ABSTRACT

The present invention relates generally to systems, methods, and computer program products for optimally allocating a fixed number of bits among a plurality of multi-media data channels. The optimal number of bits is determined by pre-processing each channel to calculate complexity data, and then the complexity data is used to determine the optimal number of bits to assign to each channel. The optimal number of bits may be determined by a closed loop controller in communication with one or more channel encoders, and the multi-media channels may contain video data conforming to the MPEG2 video format.

16 Claims, 7 Drawing Sheets

Exemplary Computer System

OPTIMAL RATE ALLOCATION FOR A GROUP OF CHANNELS

CROSS-REFERENCE TO RELATED PATENT APPLICATIONS

This application claims priority under 35 U.S.C. §119 to U.S. Provisional Patent Application Ser. No. 60/622,051, entitled "OPTIMAL RATE ALLOCATION FOR A GROUP OF CHANNELS" filed on Oct. 27, 2004, which is herein incorporated by reference in its entirety.

BACKGROUND

1. Field of the Invention

The present invention is drawn to optimally allocating bits among a plurality of data channels to be encoded by a plurality of encoders. The present invention utilizes a closed loop controller to optimally allocate bits among the plurality of channels by parsing a stream of complexity data generated by each encoder, and using the complexity data to determine the optimal number of bits to allocate to each channel. The complexity data of the present invention includes information about timing, frame type, and the bit requirements for every frame.

2. Discussion of the Related Art

The past decade has seen the rapid emergence of multi-media data transmitted across networks, and particularly the transmission of digital video to provide services such as video-on-demand, digital television broadcasts, and video content distribution. Digital video, however, contains an enormous amount of data in its raw or uncompressed state, making video compression both necessary and enabling for the delivery of video content. Further, content providers, publishers, or broadcasters often need to combine and send, or multiplex, multiple channels of compressed video data into a single output stream with a fixed bit rate in real-time or near real-time. Accordingly, there is a need in the art for systems, methods, and computer program products to optimally allocate a fixed number of bits among multiple channels of multi-media data.

Multi-media data takes many forms known in the art, including audio, picture, and video data. For example, picture data is stored as files of binary data using various raw or compressed formats including GIF, JPEG, TIFF, BMP, and PDF. Audio data includes waveform audio (WAV), MP3, audio interchange file format (AIFF), musical instrument digital interface (MIDI), and sound files (SND). Video data includes QuickTime and the Motion Picture Experts Group format (MPEG). Further treatment of the subject is provided in the book *Video Communication*. (1) *Image and Video Compression Standards*, V. Bhaskaran and K. Konstantinides, Kluwer Academic, 1995, the contents of which is hereby incorporated in its entirety.

FIG. 1 is a diagram illustrating an exemplary system for delivering multi-media data using networked computer systems. The computer systems 101, 102, 103 and networks 105 can be of the types described in the embodiment of FIG. 3, which is discussed in more detail below. On a network 105, a process called a client process (hereinafter, simply "client") operating on one computer, called a client device, makes a request of another process called a server process (hereinafter "server") executing on a computer, called a server device 103, connected to the network 105. The server 103 performs the service, often sending information back to the client.

A server device 103 contains multi-media data and a media transmission process 104 that communicates the data over a network 105 to the media server device 102. The media server device 102 includes a media server process 107 that conditions the data for communication over network 105 to a media presentation process 112 on media client device 101. The media presentation process 112 presents the multi-media data to a user.

In some embodiments, the local networks 105 may comprise a direct connection between media client device 101 and media server device 103. In other embodiments, the networks 105 include one or more transcoders that convert from one type of signal to another, encoders for compressing data, or multiplexers that combine a plurality of data channels into one output channel. In various embodiments, the networks 105 include one or more wired, wireless, or optical links.

Networks 105 can be networks that use the Internet Protocol (IP) in various embodiments. In other embodiments, networks 105 are both non-IP networks, such as a network of satellite communication links or cable television links. On a cable television link, the media server device 102 is at the cable headend and the media client device 101 may be a television set-top box or personal computer.

Video data can be encoded or transcoded into a variety of formats depending factors such as the computing resources need for real-time or near-real time encoding and delivery, storage limitations, bandwidth limitations, or media device 101 display limitations.

In some embodiments, video data is encoded into MPEG compatible data streams. MPEG is a video compression standard that defines operation of an MPEG video decoder and the composition of a MPEG stream. The video data within the MPEG stream represents a sequence of video pictures or frames. The amount of information used in MPEG to represent a frame of video varies greatly depending on factors such as visual content including color space, temporal variability, spatial variability, the human visual system, and the techniques used to compress the video data.

MPEG data may be encoded using three types of picture or frame data: Intra-frame ("I-frame") data, forward Predicted frame ("P-frame") data, and Bi-directional predicted frame ("B-frame") data. I-frame data includes all of the information required to completely recreate a frame. P-frame data contains information that represents the difference between a frame and the frame that corresponds to a previous I-frame or P-frame data. B-frame data contains information that represents relative movement between preceding I-frame data or P-frame data and succeeding I-frame data or P-frame data. MPEG comprises various encoding standards, including MPEG 1, MPEG 2, and MPEG 4. MPEG 2 in defined in the international standard ISO/IEC 138181, 2, and 3, and these standards are herein incorporated by reference in their entirety.

MPEG reduces the number of bits required to represent video data by removing spatial redundancy within a video frame (intra-frame coding) and removing temporal redundancy between successive video frames (inter-frame coding). Each frame is made up of two interlaced fields that are alternate groups of rows of pixels. Each field is made up of multiple macroblocks (MBs). Each MB is a two dimensional array of pixels, typically 16 rows of 16 pixels. Each MB comprises four luminance blocks, typically 8 rows of 8 pixels each, and two chrominance blocks, also 8 rows of 8 pixels each. Motion compensation is used to reduce temporal redundancy, typically on a macroblock basis. Spatial redundancy is reduced using the Discrete Cosine Transform (DCT), typically on a block basis. During motion compensation, a motion vector is computed that indicates pixel locations on a reference frame that is the basis for a particular macroblock on a different, current frame. Differences between the reference macroblock and the particular macroblock are then computed using the DCT.

Each MPEG video sequence is composed of a series of Groups of Pictures (GOPs). Each GOP is composed of a series of I, P, and B frames, and each GOP begins with an I frame. As known in the art, a "slice" is a series of macroblocks and may make up a field or a portion of a field.

For decoding and display, the data in the MPEG stream is sent to a client computer system such as the computer system in the embodiment of FIG. 3. For example, the MPEG stream is sent over networks 105 to media device 110.

An MPEG stream must conform to certain criteria set forth in the MPEG standards. For example, the MPEG stream may provide 30 frames per second but should not provide so many bits per second that a client computer's buffers overflow. Buffer overflow can be mitigated by requiring that the received MPEG stream be of a constant or fixed bit rate. MPEG data channels may also contain variable bit rate streams, wherein a set of frames such as a GOP is encoded using a variable number of total bits.

Often, entities such as content providers, distributors, and publishers need to combine a plurality of MPEG compatible streams and transmit the output over a fixed bandwidth channel. In this case, the individual bit rates of the channels are free to change as long as the total bit rate is fixed. FIG. 2 provides a logical overview of a group of encoders 201, 202, 203 encoding input streams to produce a plurality of variable bit rate (VBR) output streams, which are then each input to multiplexer 204 ("mux"). The multiplexer 204 accepts the input streams, buffers data, and sends out the desired constant bit rate (CBR) data stream. Accordingly, a challenge exists in the art to optimally assign bit rates to each encoder so that the multiplexer can deliver the output stream at a constant bit rate without overflowing buffers, while at the same time optimally assigning bits to each channel to provide the best possible output quality.

SUMMARY OF THE INVENTION

The present invention provides methods, systems, and computer program products for optimally allocating a total number of bits among a plurality of channels containing data to be encoded by a plurality of encoders. The present invention utilizes a closed loop controller to optimally allocate bits among the plurality of channels to be encoded by parsing a stream of complexity data generated by each encoder, and using the complexity data to optimally determine the number of bits to allocate to each encoded channel. The complexity data of the present invention includes information about timing, frame type, and the bit requirements for every frame.

Additional advantages of the invention will be set forth in part in the description which follows or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention, and together with the description, serve to explain the principles of the invention. The embodiments described in the drawings and specification in no way limit or define the scope of the present invention.

DETAILED DESCRIPTION

Before the present methods, systems, and computer program products are disclosed and described, it is to be understood that this invention is not limited to specific methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Thus, for example, reference to "an encoder" includes mixtures of encoders, reference to "an encoder" includes mixtures of two or more such encoders, and the like.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Unless otherwise expressly stated, it is in no way intended that any method or embodiment set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of embodiments described in the specification. Furthermore, while various embodiments provided in the current application refer to the statutory classes of methods, systems, or computer program products, it should be noted that the present invention may be carried out, embodied, or claimed in any statutory class.

Figure 1:
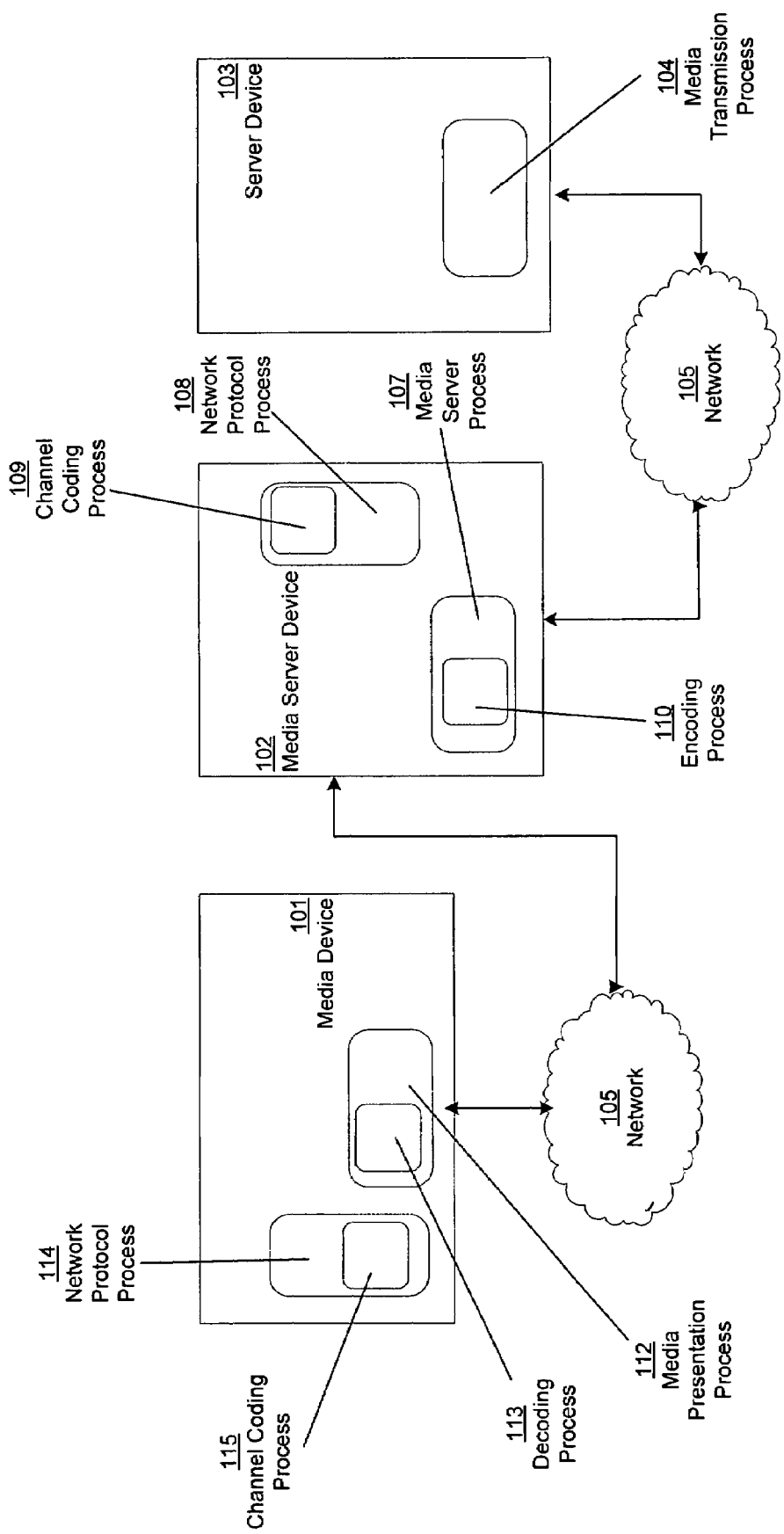
FIG. 1 is a block diagram that illustrates a system for delivering multi-media data using computer hardware over a network.
Figure 2:
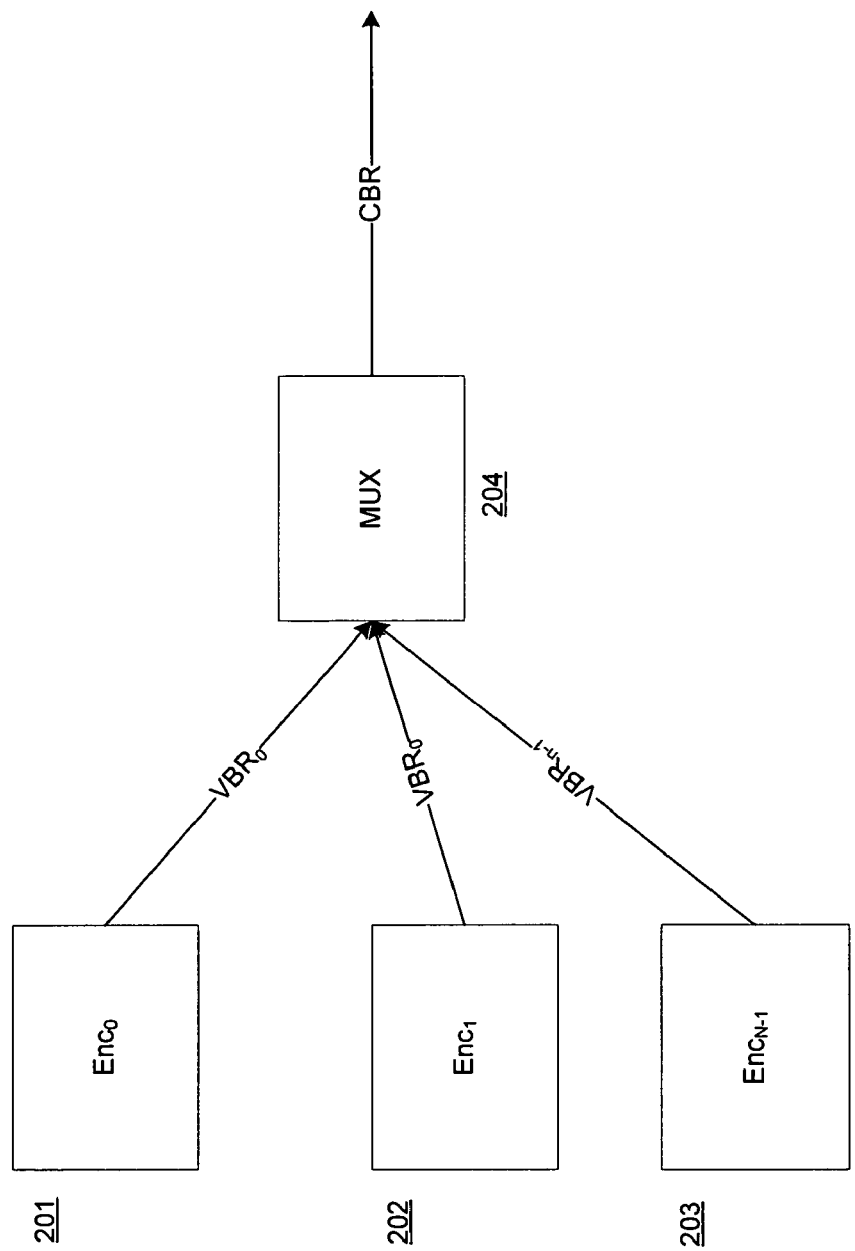
FIG. 2 is a block diagram that illustrates a plurality of encoders sending data to a multiplexer.
Figure 3:
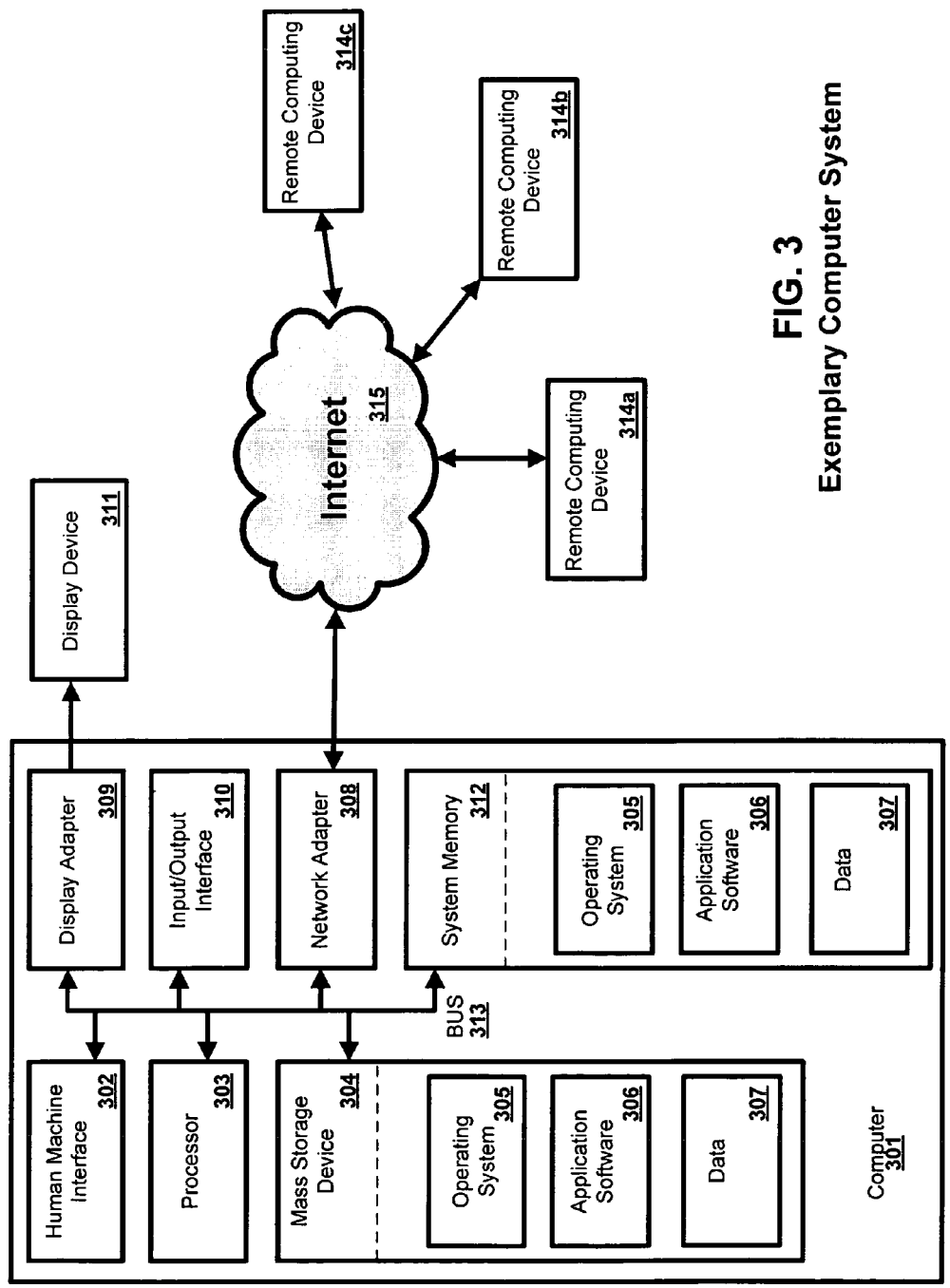
FIG. 3 is a block diagram illustrating the computer system of one embodiment of the present invention.

The system, method, and computer program product of the present invention is drawn to a novel method for allocating a fixed number of bits among a plurality of channels by using channel complexity data to determine the number of bits to assign to each channel, and is referred to herein as the "method" or "methods" of the present invention. The methods of the present invention can thus be carried out using a processor programmed to carry out the various embodiments of the present invention. FIG. 3 is a block diagram illustrating an exemplary operating environment for performing the disclosed method. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The method can be operational with numerous other general purpose or special purpose computing system environments or configurations. Examples of well known computing systems, environments, and/or configurations that may be suitable for use with the method include, but are not limited to, personal computers, server computers, laptop devices, and multiprocessor systems. Additional examples include set top boxes, programmable consumer electronics, network PCs, minicomputers, mainframe computers, distributed computing environments that include any of the above systems or devices, and the like.

The method may be described in the general context of computer instructions, such as program modules, being executed by a computer. Generally, program modules include routines, programs, objects, components, data structures, etc. that perform particular tasks or implement particular abstract data types. The method may also be practiced in distributed computing environments where tasks are performed by remote processing devices that are linked through a communications network. In a distributed computing environment, program modules may be located in both local and remote computer storage media including memory storage devices.

The method disclosed herein can be implemented via a general-purpose computing device in the form of a computer 301. The components of the computer 301 can include, but are not limited to, one or more processors or processing units 303, a system memory 312, and a system bus 313 that couples various system components including the processor 303 to the system memory 312.

The processor 303 in FIG. 3 can be an x-86 compatible processor, including a PENTIUM IV, manufactured by Intel Corporation, or an ATHLON 64 processor, manufactured by Advanced Micro Devices Corporation. Processors utilizing other instruction sets may also be used, including those manufactured by Apple, IBM, or NEC.

The system bus 313 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus. This bus, and all buses specified in this description can also be implemented over a wired or wireless network connection. The bus 313, and all buses specified in this description can also be implemented over a wired or wireless network connection and each of the subsystems, including the processor 303, a mass storage device 304, an operating system 305, application software 306, data 307, a network adapter 308, system memory 312, an Input/Output Interface 310, a display adapter 309, a display device 311, and a human machine interface 302, can be contained within one or more remote computing devices 314a,b,c at physically separate locations, connected through buses of this form, in effect implementing a fully distributed system.

The operating system 305 in FIG. 3 includes operating systems such as MICROSOFT WINDOWS XP, WINDOWS 2000, WINDOWS NT, or WINDOWS 98, and REDHAT LINUX, FREE BSD, or SUN MICROSYSTEMS SOLARIS. Additionally, the application software 306 may include web browsing software, such as MICROSOFT INTERNET EXPLORER or MOZILLA FIREFOX, enabling a user to view HTML, SGML, XML, or any other suitably constructed document language on the display device 311.

The computer 301 typically includes a variety of computer readable media. Such media can be any available media that is accessible by the computer 301 and includes both volatile and non-volatile media, removable and non-removable media. The system memory 312 includes computer readable media in the form of volatile memory, such as random access memory (RAM), and/or non-volatile memory, such as read only memory (ROM). The system memory 312 typically contains data such as data 307 and and/or program modules such as operating system 305 and application software 306 that are immediately accessible to and/or are presently operated on by the processing unit 303.

The computer 301 may also include other removable/non-removable, volatile/non-volatile computer storage media. By way of example, FIG. 3 illustrates a mass storage device 304 which can provide non-volatile storage of computer code, computer readable instructions, data structures, program modules, and other data for the computer 301. For example, a mass storage device 304 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules can be stored on the mass storage device 304, including by way of example, an operating system 305 and application software 306. Each of the operating system 305 and application software 306 (or some combination thereof) may include elements of the programming and the application software 306. Data 307 can also be stored on the mass storage device 304. Data 304 can be stored in any of one or more databases known in the art. Examples of such databases include, DB2®, Microsoft® Access, Microsoft® SQL Server, Oracle®, mySQL, PostgreSQL, and the like. The databases can be centralized or distributed across multiple systems.

A user can enter commands and information into the computer 301 via an input device (not shown). Examples of such input devices include, but are not limited to, a keyboard, pointing device (e.g., a "mouse"), a microphone, a joystick, a serial port, a scanner, touch screen mechanisms, and the like. These and other input devices can be connected to the processing unit 303 via a human machine interface 302 that is coupled to the system bus 313, but may be connected by other interface and bus structures, such as a parallel port, serial port, game port, or a universal serial bus (USB).

A display device 311 can also be connected to the system bus 313 via an interface, such as a display adapter 309. For example, a display device can be a cathode ray tube (CRT) monitor or an Liquid Crystal Display (LCD). In addition to the display device 311, other output peripheral devices can include components such as speakers (not shown) and a printer (not shown) which can be connected to the computer 301 via Input/Output Interface 310.

The computer 301 can operate in a networked environment using logical connections to one or more remote computing devices 314a,b,c. By way of example, a remote computing device can be a personal computer, portable computer, a server, a router, a network computer, a peer device or other common network node, and so on. Logical connections between the computer 301 and a remote computing device 314a,b,c can be made via a network such as a local area network (LAN), a general wide area network (WAN), or the Internet. Such network connections can be through a network adapter 308.

For purposes of illustration, application programs and other executable program components such as the operating system 305 are illustrated herein as discrete blocks, although it is recognized that such programs and components reside at various times in different storage components of the computing device 301, and are executed by the data processor(s) of the computer. An implementation of application software 306 may be stored on or transmitted across some form of computer readable media. An implementation of the disclosed method may also be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Closed Loop Controller Description

Figure 4:
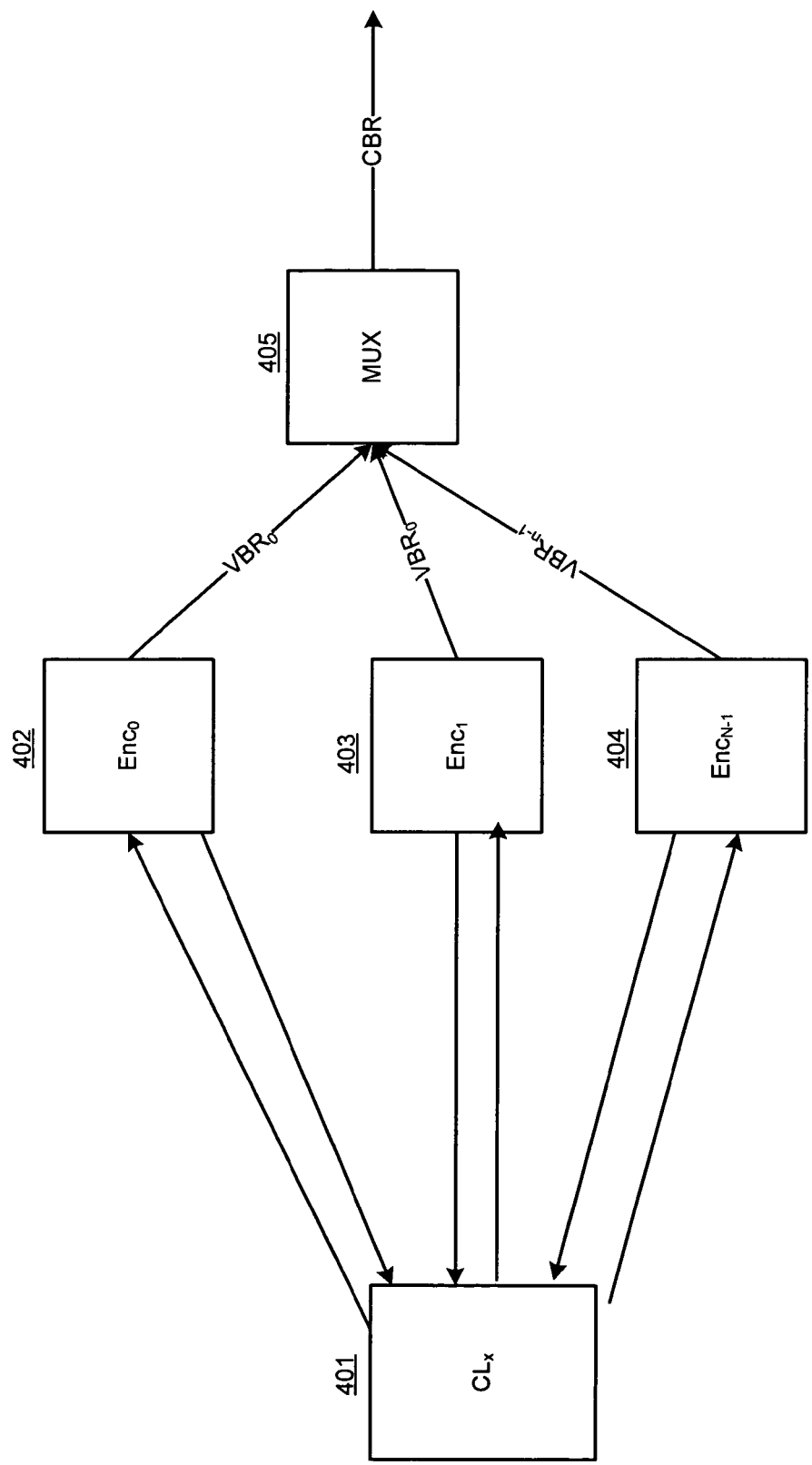
FIG. 4 illustrates a plurality of variable bit rate encoders sending data to a multiplexer outputting a single constant bit rate stream.

In one embodiment of the present invention, the closed loop controller 401 ($CL_x$) of FIG. 4 is used to optimally assign bit rates among a plurality of channels. The $CL_x$ 401 may be carried out on the computer system described in the embodiment of FIG. 3. The $CL_x$ 401 is a central bandwidth monitoring and allocation method which works in conjunction with appropriately configured encoders 402, 403, 404 to manage individual bandwidth allocations and optimize video quality output from the multiplexer 405. An encoder 402, 403, 404 may also be carried out in the various embodiments on the computer system of FIG. 3.

The closed loop controller ($CL_x$) 401 allocates bit rates by parsing a stream of complexity data ($C_0$-$C_{n-1}$), which may be generated by each encoder 402, 403, 404 in various embodiments.

The complexity data can be generated as a by-product of preprocessing and motion estimation in each encoder prior to encoding. Complexity data includes information about timing, frame type, and bit requirements for every frame.

Figure 5:
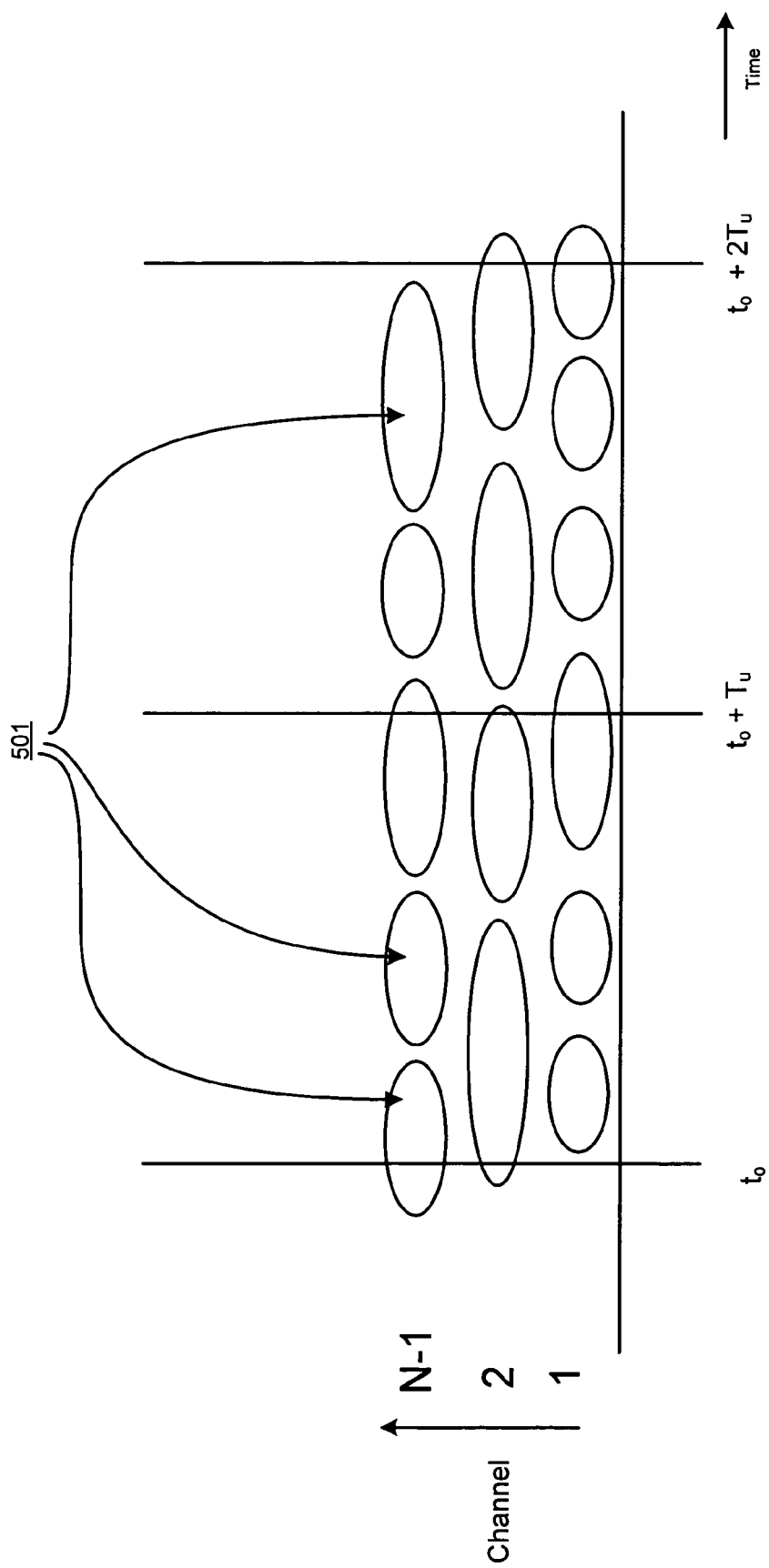
FIG. 5 illustrates a plurality of MPEG channel GOPs partitioned according to an update interval in one embodiment of the present invention.

The $CL_x$ 401 in one embodiment performs bit rate allocation by looking ahead two equidistant time intervals as shown in FIG. 5. FIG. 5 illustrates a plurality of MPEG channels with each channel comprising a stream of GOPs 501, and the GOPs 501 being partitioned about the update interval $T_u$. In FIG. 5, the ovals on each line represent GOP 501 boundaries. These boundaries can fall at any point relative to each other and the update interval $T_u$.

At periodic intervals, $T_U$, the $CL_x$ 401 examines all of the complexity data and assigned rates to encoders 402, 403, 404 subject to the following constraints:

1. Rate only changes at GOP boundaries.
2. Maximum GOP size is $T_N$ s.
3. $CL_x$ 401 must consider at least $T_R \geq T_N$ s worth of complexity data from each encoder.
4. $CL_x$ 401 updates rates with a period of $T_u$.

Given these constraints, one of skill in the art will see that $T_L \geq T_N + T_R$ is the minimum amount of time that each encoder's 402, 403, 404 complexity estimation process must be ahead of the encoding process.

At time $t_o + 2T_u$, each encoder 402, 403, 404 in the current embodiment is encoding the frame at time $t_o^-$ (or earlier) and estimating complexity for time $t_o + 2T_u^+$ (or later). The closed loop controller 401 must calculate rates for all GOPs 501 that start in the time interval ($t_o$, $t_o + T_u$) at time $t_o + 2T_u$. At the same time, the $CL_x$ 401 will assign a target number of bits for all frames in the interval ($t_o + T_u$, $t_o + 2T_u$).

Optimal Bit Allocation

The present invention allocates bits using a model. One model is given by:

$$\frac{S}{B} = K_1 D + K_2$$

Equation 1: Bit Production Model where S is a complexity measurement, D is the distortion of the reconstructed frame, B is the number of bits required for a frame, and $K_1$ and $K_2$ are constants. This model provides suitable accuracy when allocating bits among multiple frames.

In the current embodiment, S is computed by partitioning the frames during the intervals ($t_o$, $t_o + T_u$) and ($t_o + T_u$, $t_o + T_u$) and summing individual frame complexities, denoted $C_i$, within each interval. The frame complexities $C_i$ can be computed in a variety of ways. One approach is to use complexity measures that arise directly from preprocessing. Preprocessing involves tasks such as image scaling, scene change detection, film detection, noise filtering, conversion to frame coding order, and crude motion estimation. Together these operations provide a rich source of complexity measures. In one embodiment of the present invention, the following types of metrics are computed:

1. Macroblock intra complexity given by:

$$C_{intra} = \sum_{b=1}^{6} \sum_{x=0}^{7} \sum_{y=0}^{7} |p[b][x][y] - \mu[b]|$$

where p[b][x][y] is the pixel value at location (x,y) in the 8×8 block indicated by index b. For 4:2:0 video each macroblock contains six 8×8 blocks. Also μ[b] is the average value for p[b][x][y] in the 8×8 block with index b.

2. Macroblock inter complexity (for P and B frames) given by:

$$C_{inter} = \sum_{b=1}^{6}\sum_{x=0}^{7}\sum_{y=0}^{7} |p[b][x][y] - r[b][x][y]|$$

where r[b][x][y] is pixel value of the best prediction macroblock at location (x,y) in the 8×8 block indicated by index b. Note for B frames there are two inter measures per macroblock for the forward and backward prediction.

3. Estimated motion vector bits (for P and B frames) computed by coding the difference in the optimal prediction vector between the current block and the previous block with the MPEG2 VLC table.

$C_i$ is then computed by summing the minimum of $C_{inter}$ and $C_{intra}$ for each macroblock in the frame. Experimental results have shown that for multiple frames this complexity fits Equation 1 with sufficient accuracy. Better accuracy may be achieved by using feedback as well to calculate the precise values of $k_1$ and $k_2$ for each channel in one embodiment of the present invention. In this case, we assume $k_1$ and $k_2$ are the same for all channels to simplify the optimization procedure.

The final macroblock metric mentioned above is the estimated motion vector bits. As with the complexities, these macroblock values can be summed to arrive at an estimate of the total number of motion vector bits that will be required for each frame. These bits may be factored into the complexity estimate in an ad-hoc manner or they can be used directly in the allocation strategy outlined below. Specifically, the estimated bits can simply be subtracted from the total bits allocated before allocation and then added back after all bits have been assigned.

The frames in interval $(t_o+T_u, t_o+2T_u)$ are then divided into M groups. Two possible groupings are:

(1) M=N and $S_i$=sum of all complexities for channel i in interval $(t_o+T_u, t_o+2T_u)$.

(2) M=Number of full or partial GOPs during interval $$S_i = \sum_{j=1}^{\text{Number frames in partition } i} C_j.$$

Regardless of the partition of frames in interval $(t_o+T_u, t_o+2T_u)$, we have M models for the rate. In all cases, we require:

$$\sum_{i=1}^{M} B_i = R_T T_u$$

where $R_T$ is the total target rate and $T_u$ is the update time, and $B_i$ is the number of bits allocated to partition i.

There are at least two useful solutions to the model of the current embodiment. In the first solution we minimize $$\sum_{i=1}^{M} D_i.$$

In other words, we seek to minimize the total distortion on all channels over the time interval $(t_o+T_u, t_o+2T_u)$. Solving with Lagrange multipliers gives:

$$B_i = \left(\frac{\sqrt{S_i}}{\sum_{j=1}^{M}\sqrt{S_j}}\right) R_T T_\mu$$

Equation 2: Optimal Bit Assignment to Minimize Total Error

A second solution is obtained if we desired to minimize the maximum distortion. In this case all distortions must be equal such that $D_i$=D. Solving this equation together with the constraint yields:

$$B_i = \left(\frac{S_i}{\sum_{j=1}^{M} S_j}\right) R_T T_\mu$$

Equation 3: Optimal Bit Assignment to Minimize Maximum Error

Other bit production models may be substituted by one of skill in the art to optimally allocate bits using the $CL_x$ 401 disclosed above without departing from the scope and spirit of the invention.

Figure 6:
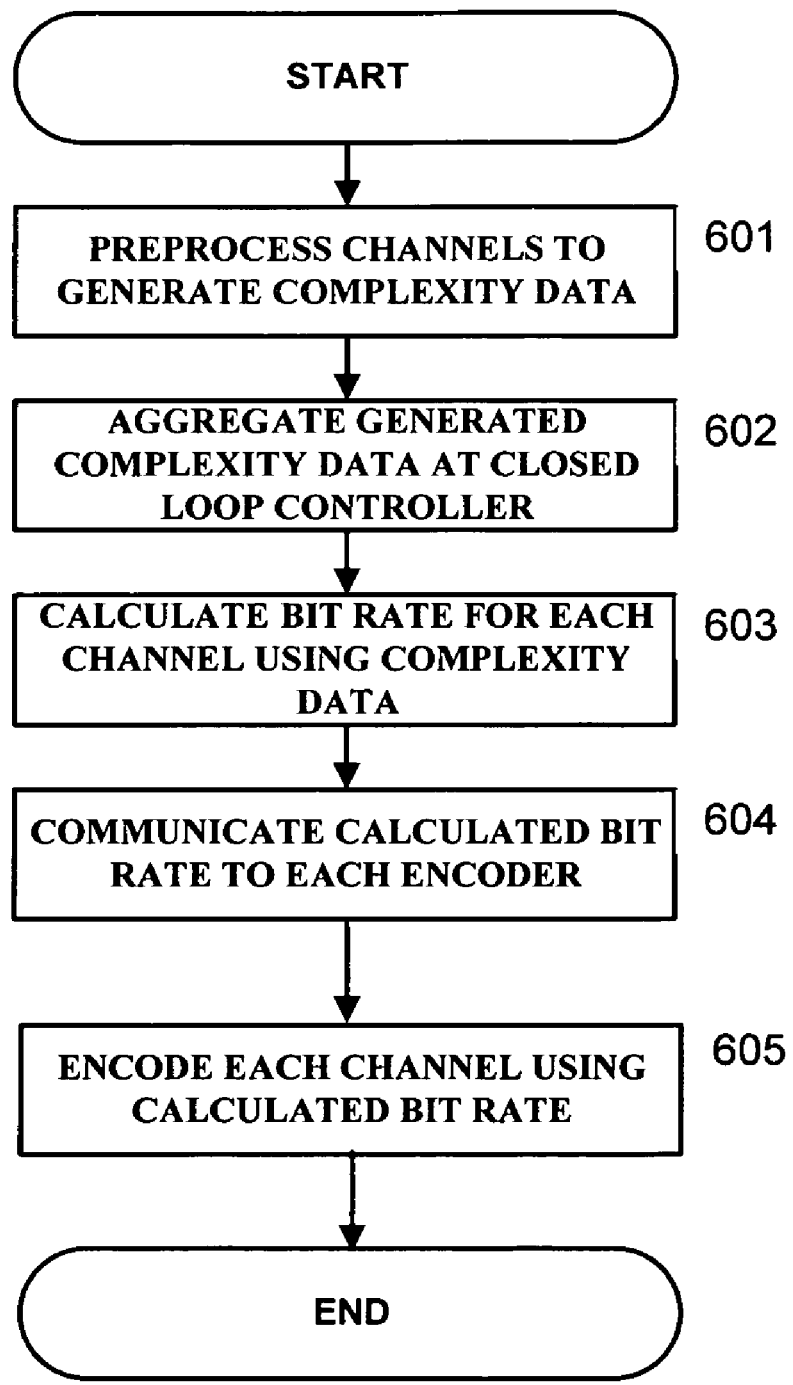
FIG. 6 is a flow diagram illustrating one embodiment of the present invention for encoding a plurality of data channels using a fixed number of bits.

In view of the above, several methods have been disclosed for optimally allocating bits among a plurality of data channels. One method for allocating a number bits among a plurality of multi-media channels is illustrated in the embodiment of FIG. 6. First, each channel is processed before encoding, or preprocessed 601, to generate complexity data by analyzing each channel. Second, the generated complexity data is aggregated at a closed loop controller 602, which is used to determine the number of bits to assign to each channel. Third, the closed loop controller calculates a bit rate to assign to each channel based on the complexity data 603. Fourth, the calculated bit rates for each channel are communicated from the closed loop controller to an encoder 604. Finally, each channel is encoded using the communicated bit rate 605.

Figure 7:
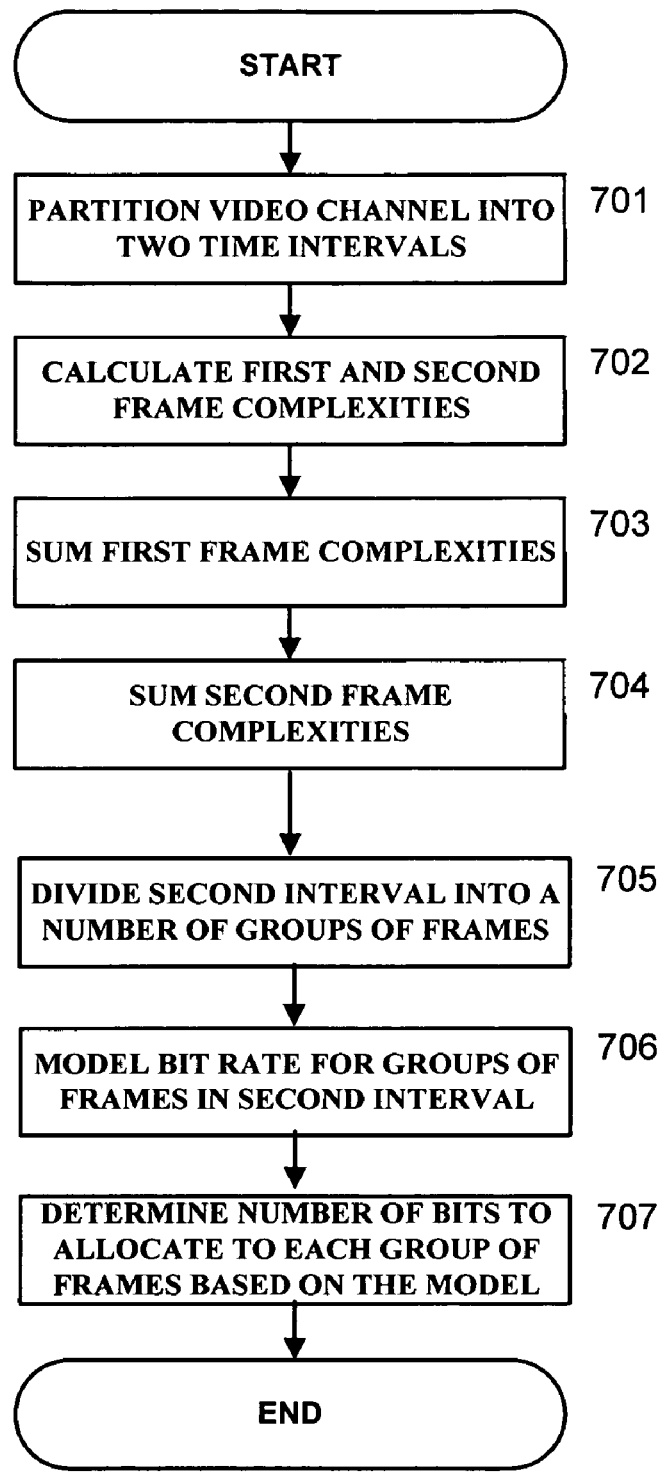
FIG. 7 is a flow diagram illustrating one embodiment of the present invention for determining a number of bits to allocate to a video channel in a plurality of video channels.

Another embodiment of the present invention can be seen in FIG. 7, which illustrates a method for determining a number of bits to allocate to a group of frames in a video channel. First, in the embodiment of FIG. 7, the video channel is partitioned into two time intervals before the channel is encoded 701, where the time intervals comprise a first interval and a second interval. Second, a first frame complexities is calculated for the first interval, and a second frame complexities is calculated for the second interval 702. Next, the first frame complexities are summed 703, and the second frame complexities are summed 704.

Next, in the embodiment of FIG. 7, the second interval is divided into a number of groups of frames 705. Sixth, the bit rate for the groups of frames in the second interval is modeled 706. Finally, the number of bits to allocate to each of the groups of frames in the channel is determined using the model 707.

Closed Loop Controller Implementation

In another embodiment of the present invention, the closed loop controller, such as the controller of FIG. 4, is implemented as a $CL_x$ master controller process executing on a computer system using the Linux Operating System, with no requirement that a $CL_x$ master and the encoder be co-resident on the same system. Encoders operate as network servers, listening on a well-known port for connections from a $CL_x$ master. The $CL_x$ master is a network client, establishing UDP/IP (Datagram) connections to encoders to transfer control information and complexity estimates. Proper operation requires synchronization of various time components across the system. Operational information is distributed, with some information managed by the $CL_x$ master and other information managed by individual encoders. Both the closed loop controller and the encoders may operate on the exemplary computer system described in FIG. 3. The method operates in phases as described in following sections.

Startup Phase

The $CL_x$ multi-thread process is started during normal system startup in one embodiment. Basic configuration information obtained at startup includes:

Master Enabled (determines if the $CL_x$ process is currently controlling encoders).

Aggregate bandwidth shared across managed encoders.

List of managed encoder's IP addresses.

Since other configuration information is distributed, the $CL_x$ master acquires baseline information during the startup phase. In addition, time base correlations are established for proper operation of the allocation algorithm. The $CL_x$ master will not complete the initial startup phase unless the required information can be obtained from all encoders configured at that time. If all encoders do not respond, the master raises an alarm and continually attempts to obtain the required information for startup. Time correlation is required to add an encoder in the managed group. Initial correlations are acquired during the startup phase.

A successful startup includes these steps for each managed encoder:

1. Establish a UDP connection between the $CL_x$ master and the encoder.
2. Establish system clock and PCR time correlations.
3. Acquire per-encoder closed loop configuration information.
4. Send a start command to the encoder.
5. Request complexity estimates from the encoder.

Steady State

During normal steady state operation the $CL_x$ controller:

Processes complexity estimates from managed encoders.

Issues rate targets to managed encoders.

Maintains time correlations.

In one embodiment, complexity estimates are sent from the encoders at frame rate and accumulate at the $CL_x$ controller. At roughly GOP-rate, the $CL_x$ controller processes the complexity estimates producing target encoding rates for each encoder. Each target rate delivered to an encoder includes an authorization to send a new quota of complexity estimates.

Error Detection and Recovery Phase

In one embodiment, the principal non-operator induced error detected by and automatically recovered from is the absence of timely complexity estimates resulting in the inability to calculate target rates for a delinquent encoder, or if undetected failure of the allocation algorithm occurs.

Time Correlation Phase

The controller synchronizes the local system clock to the remote encoder system clock using timestamps added to messages transferred between the systems. All of the time domain information referred to below is in the time domain of the multiplexer.

Rate Allocation Algorithm

The rate allocation algorithm executes at a regular interval that is set by the maximum GOP size of all the encoders in one embodiment of the present invention. When the allocation algorithm executes it analyzes all complexities received for the last two time intervals and assigns a target number of bits for each GOP on each encoder that starts in the oldest time interval. In one embodiment, the target bits assigned to each GOP are computed to optimize a quality metric while meeting a constraint on the total number of bits allocated in the interval. The quality metric and constraint used can be set depending on the application of the system. The output of the rate allocation algorithm is a target bit rate for each GOP in each encoder. The output is sent back to each encoder in the group to complete the loop.

Overall channel constraints are met by assigning bits at regular intervals. The sum of the bits allocated in each interval is chosen such that the overall target rate is met precisely. However, within any specific short time period the total average rate of the group of encoders may vary significantly from the target. Constraints can be applied to reduce this variability, but the default mode of operation chooses the rate assignment to minimize distortion and meet simple minimum/maximum bit rate constraints.

The bit allocation method of one embodiment can be performed by using several logical functions, which will be described in detail. First, the AssignRate function is a top level routine that assigns and returns a final RATE to all CL, participants for GOPs starting in time period [Tcur−2Tu, Tcur−Tu). This routine also assigns initial BITS to all groups for time period [Tcur−Tu,Tcur). The initial bits may be changed on the next call to AssignRate. Below the functions called by AssignRate are detailed in one embodiment of the present invention. The AssignRate function calls various other functions to optimally determine the bit rate for each channel, including CollectSummaries, BoundBits, ComputeBits, SetBits, ClipBits, Repeat, and CalculateRates.

This specification also includes, for certain steps, pseudo code which can be used by one of skill in the art to more easily implement the rate allocation algorithm of the present invention. The variables, methods, functions, logic, and flow of the provided pseudo code are in no way meant to limit or define how the algorithm may be carried out in various embodiments.

The following pseudo code variables will be used, and are for illustrative purposes only:

N=number of channels;

S[1][x]=complexity summary number x in time period [Tcur−Tu,Tcur). Max. value of x depends on data and N;

S[1][x]=Si if goal is to minimize total distortion;

S[1][x]=sqrt(Si) if goal is minimize maximum distortion;

S[0][x]=complexity summary number x in time period [Tcur−2*Tu,Tcur−Tu);

T[y][x]=length of group S[y][x] in seconds;

B[y][x]=bits assigned to group S[y][x];
C0=maximum number of x in S[0][x];
C1=maximum number of x in S[1][x];
Tcur=Time current;
Ba=adjustment bits;
K=iteration number;
Bt=bit target;
M1[i]=number of full or partial GOPs in period [Tcur−Tu, Tcur) for encoder i; and
M0[i]=number of full or partial GOPs in period [Tcur−2Tu,Tcur−Tu) for encoder i.

The CollectSummaries function aggregates incoming frame complexities to form group complexities for all frames in the time period [Tcur−T,Tcur). A group starts with either an I frame or the first frame of any type in the time period. Likewise, a group ends with an I frame or the last frame in any time period. On one embodiment, the complexities S[y][x] below are modified with ad-hoc factors to give better results in special circumstances. For example, S[y][x] is increased when fades, bright flashes, or very short GOPs are found. All of these conditions will degrade the accuracy of the bit production model, so changes to the value of S[y][x] are sometimes warranted. However, these adjustments are only transient phenomenon.

CollectSummaries pseudo code:

```
C0 = C1;            // Time slot shifts one
S[0][*] = S[1][*];
M0[*] = M1[*];
C1 = 0;
Reset S[1][*];
Parse frame types and timing to compute M1[*]
for (i=0;i < N;i++) {
    for (j=0;j < M1[i];j++) {
        S[1][C1] = Complexity Summary from group j of encoder i;
        C1++;
    }
}
```

The BoundBits function calculates min/max bit assignment constraints for each group in [Tcur−2Tu,Tcur). In some embodiments, there may be bounds on the number of bits that can be allocated for each GOP. At a minimum each encoder has a minimum and maximum bit rate. This is the part of the algorithm where constraints of downstream equipment or the encoders can be applied. Any constraint that results in a bound on the number of bits that are allocated to a GOP can be included. Channel constraints can also be applied in this step.

BoundBits pseudo code:

```
Bmin[1][x] = minimum number of bits that can be allocated for S[1][x]
Bmin[0][x] = minimum number of bits that can be allocated for S[0][x]
Bmax[1][x] = maximum number of bits that can be allocated for
             S[1][x]
Bmax[0][x] = maximum number of bits that can be allocated for
             S[0][x]
for (i = 0;i<2;i++) {
    for (j = 0;j < Ci;j++) {
        Compute Bmin[i][j] based on currently allocated bits
        Compute Bmax[i][j] based on currently allocated bits
    }
}
```

In the for loop above, one of skill in the art will realize that the condition may occur where Bmin[i][j]=Bmax[i][j], which will be true for all groups in [Tcur−2Tu,Tcur−Tu) that belong to GOPs that straddle Tcur−2Tu.

The ComputeBits function computes the target number of bits to be assigned and sets the bit assignment scheme. On the first time through the loop, the target is simply Rt*Tu (i.e. the total number of bits available in time slot [Tcur−Tu,Tcur)). The assignment scheme is determined by how many iterations (i.e. K) we have processed. Initially the assignment scheme is optimal and all bits are reallocated; however, this scheme may not converge. Eventually, the assignment scheme switches to an additive mode to force convergence.

ComputeBits pseudo code:

```
if (Ba == 0) {
    Bt = Rt*Tu;        // First time thru the loop
} else {
    Bt = Ba;
    if (K > Kopt) {
        break;    // Break out of loop to force convergence
    }
    for (i = 0;i<2;i++) {
        for (j = 0;j < Ci;j++) {
            if (Bmin[i][j] == Bmax[i][j]) {
                continue;
            }
            if (B[i][j] == Bmin[i][j] && Ba > 0) {
                Bt += B[i][j];
                continue;
            }
            if (B[i][j] == Bmax[i][j] && Ba < 0) {
                Bt += B[i][j];
                continue;
            }
            if (B[i][j] != Bmax[i][j] && B[i][j] != Bmin[i][j]) {
                Bt += B[i][j];
                Continue;
            }
        }
    }
}
```

The SetBits function allocates bits in time period [Tcur−2Tu, Tcur) using the target provided by ComputeBits. This is the step where Equation 2 and Equation 3 are effectively applied.

SetBits pseudo code:

```
St = 0;
for (i = 0;i<2;i++) {
    for (j = 0;j < Ci;j++) {
        if (Bmin[i][j] == Bmax[i][j]) {
            continue;
        }
        if (B[i][j] == Bmin[i][j] && Ba > 0) {
            St += S[i][j];
            continue;
        }
        if (B[i][j] == Bmax[i][j] && Ba < 0) {
            St += S[i][j];
            continue;
        }
        if (B[i][j] != Bmax[i][j] && B[i][j] != Bmin[i][j]) {
            St += S[i][j];
            continue;
        }
    }
}
if (St == 0) {
    Convergence reached, constraints cannot be met. goto
    CalculateRates.
}
for (i = 0;i<2;i++) {
    for (j = 0;j < Ci;j++) {
        if (Bmin[i][j] == Bmax[i][j]) {
            continue;
        }
        if (B[i][j] == Bmin[i][j] && Ba > 0) {
```

```
        if (K < Kopt) {
            B[i][j] = (S[i][j]/St)*Rt;
        } else {
            B[i][j] += (S[i][j]/St)*Rt;
        }
        continue;
    }
    if (B[i][j] == Bmax[i][j] && Ba < 0) {
        if (K < Kopt) {
            B[i][j] = (S[i][j]/St)*Rt;
        } else {
            B[i][j] += (S[i][j]/St)*Rt;
        }
        continue;
    }
    if (B[i][j] != Bmax[i][j] && B[i][j] != Bmin[i][j]) {
        if (K < Kopt) {
            B[i][j] == (S[i][j]/St)*Rt;
        } else {
            B[i][j] += (S[i][j]/St)*Rt;
        }
        continue;
    }
}
```

The ClipBits function forces minimum/maximum bit assignments to meet constraints.

ClipBits pseudo code:

```
Ba = 0;
for (i = 0;i<2;i++) {
    for (j = 0;j < Ci;j++) {
        if (B[i][j] > Bmax[i][j]) {
            Ba += B[i][j] - Bmax[i][j];
            B[i][j] = Bmax[i][j];
        }
        if (B[i][j] < Bmin[i][j]) {
            Ba -= Bmin[i][j] - B[i][j];
            B[i][j] = Bmin[i][j];
        }
    }
}
```

The Repeat function repeats the CollectSummaries, BoundBits, ComputeBits, SetBits, and ClipBits functions until convergence is reached or until the method has run out of iterations.

Repeat pseudo code:

```
K++;
if (K > Kmax || Ba == 0) {
    goto CalculateRates;
}
goto BoundBits;
```

The CalculateRates function calculates and returns rates for all GOPs beginning in time period [Tcur−2Tu, Tcur−Tu). A GOP can span more than 1 group as defined for the calculations above, which happens when a GOP crosses the allocation boundary at Tcur−Tu. In this case the total bits for the GOP and hence the rate come from two separate B[x][y]'s.

CalculateRates pseudo code:

```
for (i = 0;i<2;i++) {
    for (j = 0;j < Ci;j++) {
        if (S[i][j] corresponds to GOP staring in
            [Tcur-2Tu,Tcur-Tu)) {
            Let [i'][j'] refer to the group that contains the
                start of the GOP for
                    S[i][j]
            If (i==I' && j==j') {
                R[i][j] = (B[i][j])/(T[i][j];
            } else {
                R[i][j] = (B[i][j] + B[I'][j'])/(T[i][j] + T[i'][j'];
            }
        }
    }
}
```

The algorithm of the present invention has now, as shown above, determined the optimal number of bits to assign to each channel of multi-media data, given a fixed number of total bits and a plurality of data channels. The bit allocation algorithm of the present invention has been illustrated in relation to embodiments which are intended in all respects to be illustrative rather than restrictive. Those skilled in the art will realize that the present invention is capable of many modifications and variations without departing from the scope of the invention.

I claim:

1. A method for real-time encoding a plurality of data channels using a fixed number of total bits, comprising the steps of:
   a. preprocessing each channel to generate complexity data by analyzing each channel before it is encoded, wherein the preprocessing step comprises the step of preprocessing each channel to generate complexity data by analyzing each channel for a first time period and a second time period ahead of the encoding process;
   b. aggregating the generated complexity data at a closed loop controller;
   c. calculating, by the closed loop controller, a bit rate to assign to each channel based on the generated complexity data, wherein the bit rate assigned to each channel is determined by optimizing a channel distortion model, wherein the channel distortion model is defined by the relation:

$$\frac{S_i}{B_i} = K_1 D_i + K_2,$$

wherein
   $S_i$ is a complexity measurement computed by summing frame complexities of an $i^{th}$ channel, a function of the time period boundaries of the first time period, and a function of the time period boundaries of the second time period,
   $B_i$ is a number of bits,
   $K_1$ and $K_2$ are nonzero constants, and
   $D_i$ is distortion from an $i^{th}$ encoder;
   d. communicating the calculated bit rate for each channel from the closed loop controller to an encoder; and
   e. encoding each channel using the communicated bit rate.

2. The method of claim 1, wherein each channel contains multi-media data.

3. The method of claim 2, wherein the multi-media data is video data.

4. The method of claim 3, wherein complexity data includes information about timing, frame type, and bit requirements for every video frame.

5. The method of claim 4, wherein the video data has a variable bit rate.

6. The method of claim 5, wherein the first time period spans a time zero forward to an update time, a second time period adjoins the first time period and spans from the update time forward to twice the update time, and wherein video frames from time zero or earlier are encoded when the current time is twice the update time.

7. The method of claim 1, wherein $S_i$ is computed by partitioning frames during the first time period and the second time period and summing the frame complexities $C_i$ within each partition.

8. The method of claim 7, wherein the frame complexities $C_i$ are computed using inter-frame and intra-frame statistics.

9. The method of claim 8, wherein the frames in the second time period are divided into M groups.

10. The method of claim 9, wherein the number of groups M is equal to the number of channels, and the channel complexity $S_i$ is the sum of all complexities for that channel in the second time period.

11. The method of claim 9, wherein the number of groups M is equal to the number of full or partial Groups of Pictures (GOPs) for the channel in the second time period.

12. The method of claim 9, wherein there are M models for the rate, total target rate $R_T$, update time $T_u$, and the number of bits $B_i$ allocated to group $M_i$ is represented by the relation:

$$\sum_{i=1}^{M} B_i = R_T T_u.$$

13. The method of claim 12, wherein the distortion model is used to minimize the maximum distortion on all channels in the second time period.

14. The method of claim 12, wherein the distortion model is used to minimize the maximum distortion on all channels in the second time period by solving the distortion model using the relation:

$$B_i = \left( \frac{\sqrt{S_i}}{\sum_{j=1}^{M} \sqrt{S_j}} \right) R_T T_\mu,$$

wherein $T_\mu$ is an update interval and $S_j$ is a complexity measure in an interval j.

15. The method of claim 12, wherein the distortion model is used to minimize the maximum error on all channels in the second time period.

16. The method of claim 12, wherein the distortion model is used to minimize the maximum error on all channels in the second time period by solving the distortion model using the relation:

$$B_i = \left( \frac{S_i}{\sum_{j=1}^{M} S_j} \right) R_T T_\mu,$$

wherein $T_\mu$ is an update interval and $S_j$ is a complexity measure in an interval j.

\* \* \* \* \*